(12) United States Patent
Sae-Ueng et al.

(10) Patent No.: US 7,071,582 B2
(45) Date of Patent: Jul. 4, 2006

(54) OUTPUT RISING SLOPE CONTROL TECHNIQUE FOR POWER CONVERTER

(75) Inventors: Sakda Sae-Ueng, Samutprakarn (TH); Mingchun Xu, Samutprakarn (TH)

(73) Assignees: Delta Electronics, Inc. (TW); Delta Electronics (Thailand) Public Company, Limited (TH)

( * ) Notice: Subject to any disclaimer, the term of this patent is extended or adjusted under 35 U.S.C. 154(b) by 490 days.

(21) Appl. No.: 10/425,266

(22) Filed: Apr. 29, 2003

(65) Prior Publication Data

US 2004/0218319 A1    Nov. 4, 2004

(51) Int. Cl.
*H02J 3/00* (2006.01)
(52) U.S. Cl. ........................................ 307/83
(58) Field of Classification Search .................. 307/83
See application file for complete search history.

(56) References Cited

U.S. PATENT DOCUMENTS

| | | | |
|---|---|---|---|
| 4,642,743 A | * | 2/1987 | Radcliffe ............... 363/21.07 |
| 5,418,703 A | * | 5/1995 | Hitchcock et al. ............ 363/17 |
| 5,612,862 A | * | 3/1997 | Marusik et al. ................ 363/93 |
| 6,483,726 B1 | * | 11/2002 | Chen et al. .............. 363/21.18 |
| 6,490,179 B1 | * | 12/2002 | Boylan et al. ........... 363/21.06 |
| 6,490,184 B1 | * | 12/2002 | Jiang et al. .................... 363/98 |
| 6,614,131 B1 | * | 9/2003 | Lentini et al. ................. 307/39 |
| 6,785,151 B1 | * | 8/2004 | Ingman et al. ................ 363/91 |

FOREIGN PATENT DOCUMENTS

JP        2002-223566        *   8/2002

* cited by examiner

*Primary Examiner*—Brian Sircus
*Assistant Examiner*—Hal I. Kaplan
(74) *Attorney, Agent, or Firm*—Michael Best & Friedrich LLP

(57) ABSTRACT

An output voltage rising slope control technique for a power converter is addressed. The output voltage rising slope control technique according to the present invention basically uses a reference voltage generator to precipitate the rising slopes of multiple output voltages of a power converter to approach a unanimity with each other during a start-up period, and thereby avoiding the occurrence of system faults in the power converter due to the instantaneously rapid increase of output voltage thereof during the start-up period.

12 Claims, 7 Drawing Sheets

US 7,071,582 B2

OUTPUT RISING SLOPE CONTROL TECHNIQUE FOR POWER CONVERTER

FIELD OF THE INVENTION

The present invention is related to the field of a power converter, and more particularly to a technique for controlling the output rising slope in a power converter.

BACKGROUND OF THE INVENTION

FIG. 1 shows a circuit configuration of a power converter using post-regulator(Mag-Amp) according to the prior art. As shown in FIG. 1, a prior art power converter using post-regulator(Mag-Amp) generally includes a switch control circuit 101, a magnetic amplifier 102, output rectifier 103, an output filter 104, a resistive-type voltage divider 105, and a reference voltage generator 106. The magnetic amplifier 102 is used to control the duty of an AC voltage $V_{AC}$ induced at the secondary side of the transformer $T_1$ by way of magnetic coupling, and the resulting amplified voltage is converted into a DC voltage by the output rectifier 103. The resulting DC voltage is then filtered and smoothed by the output filter 104 comprised of an inductor $L_A$ and a capacitor $C_A$, and thereby provided as an output voltage Vo for a load (not shown). In addition, a fraction of the output voltage Vo (which is indicated by a reference numeral $V_S$) is sensed and sent to the switch control circuit 101 through a resistive-type voltage divider 105 made up of resistors $R_A$ and $R_B$. The switch control circuit 101 uses an internal comparator (not shown for simplicity) to compare the fractional output voltage $V_S$ with a reference voltage Vref provided by a reference voltage generator 106, and in response thereto generates a control signal. An internal driving circuit of the switch control circuit 101 which is normally accomplished with a transistor drives the Mag-Amp 102 to control the duty of Vac, rectified by output rectifier 103, allowing the output voltage Vo to be stabilized. On the other hand, a housekeeping circuit (not shown in the drawings) is able to transmit a remote ON/OFF signal to the power converter to supply output voltage $V_o$ to a load, such as a motherboard of a PC or a hard disk drive.

Some power supplies are able to provide multiple output voltages, each of which has a predetermined voltage level, for example, 5V or 3.3V, and each output voltage is sufficient to enable the appropriate operations of one or more electronic appliances that can operate under such output voltage. As shown in FIG. 2a, a first output voltage Vout1 of a power converter is increased up to a stable voltage level such as 5V with a fixed rising slope within its start-up period (0-t1) At this time, the power converter is operating under a start-up mode. The start-up period (or set-up period) referred to herein indicates a time period calculated from the moment at which an input terminal of the power converter is connected with a power source to the moment at which the output voltage becomes stable. Similarly, a second output voltage Vout2 of a power converter is increased up to a stable voltage level such as 3.3V with a fixed rising slope within its start-up period (0-t2), and the rising slope of the first output voltage Vout1 and the rising slope of the second output voltage Vout2 are quite close to each other. When both of the two output voltages are stabilized, the power converter can output two output voltages of different voltage levels to different loads, and then the power converter is driven to operate under a normal mode.

However, the load collocated with a power converter typically behaves as a dynamic load element. Therefore, in practical operation of a power converter, the load current of a power converter is also dynamically varying with time instead of being kept at a constant level. As a result, it is possible that the instantaneous load current variation causes the output voltage rising slope to change during a start-up period of a power converter. As shown in FIG. 2(b), the first output voltage Vout1 outputs an excessive voltage instantaneously by the influence of a corresponding load condition, so that the rising slope of the first output voltage Vout1 increases significantly. However, the rising slope of the second output voltage Vout2 remains constant, which may lead to a situation that a difference between an instantaneous voltage value of the first output voltage Vout1 and an instantaneous voltage value of the second output voltage Vout2 at time t3 is larger than a difference between a stabilized voltage value of the first output voltage Vout1 and a stabilized voltage value of the second output voltage Vout2, for example, 5V−3.3V=1.7V. That may cause the system to conduct faulty operations. More seriously, the whole power system may shut down accordingly. Such a phenomenon in which an instantaneous voltage value of one of the output voltages is sharply increased during the start-up period thus causing an improper operation of the power converter is generally called "rising slope out of control".

In view of the foregoing descriptions, what is needed is a rising slope control technique for a power converter to obviate the occurrence of an "out of control" problem encountered during a start-up period of the power converter and ensure the proper operation of the system.

SUMMARY OF THE INVENTION

A broader aspect of the present invention is fulfilled with a power converter, including at least two magnetic amplifiers each of which is magnetically coupled to an AC voltage induced at a winding of a transformer, at least two switch circuits each of which is coupled to one of the magnetic amplifiers for converting an amplified AC voltage from the magnetic amplifier into a DC voltage, at least two output filters each of which is coupled to one of the switch circuits for providing a predetermined output voltage to a load, at least two switch control circuits each of which compares an output voltage with a reference voltage and generates a control signal based on a comparison result to control the on/off operation of one of the switch circuits, and a reference signal generator coupled to the switch control circuits for respectively providing a reference signal to a single switch control circuit and precipitating the rising slopes of the output voltages of the power converter to approach a unanimity during the start-up period.

According to a narrower sense of the present invention, the above-described reference voltage generator further includes a linear voltage generating circuit for generating a linear voltage with a rising slope, a first voltage with a rising slope based on a predetermined voltage level and thereby generating a first reference voltage, and a second reference voltage generating block for imposing a time delay on the linear voltage with a rising slope and tuning a rising slope of the linear voltage with a rising slope, and thereby generating a second reference voltage.

BRIEF DESCRIPTION OF THE DRAWINGS

The features and advantages of the present invention will be made obvious to those skilled in the art through the following descriptions with reference to the accompanying drawings. It is to be noted that like reference characters refer to the same parts throughout the specification and drawings.

DETAILED DESCRIPTION OF THE PREFERRED EMBODIMENT

Figure 1:
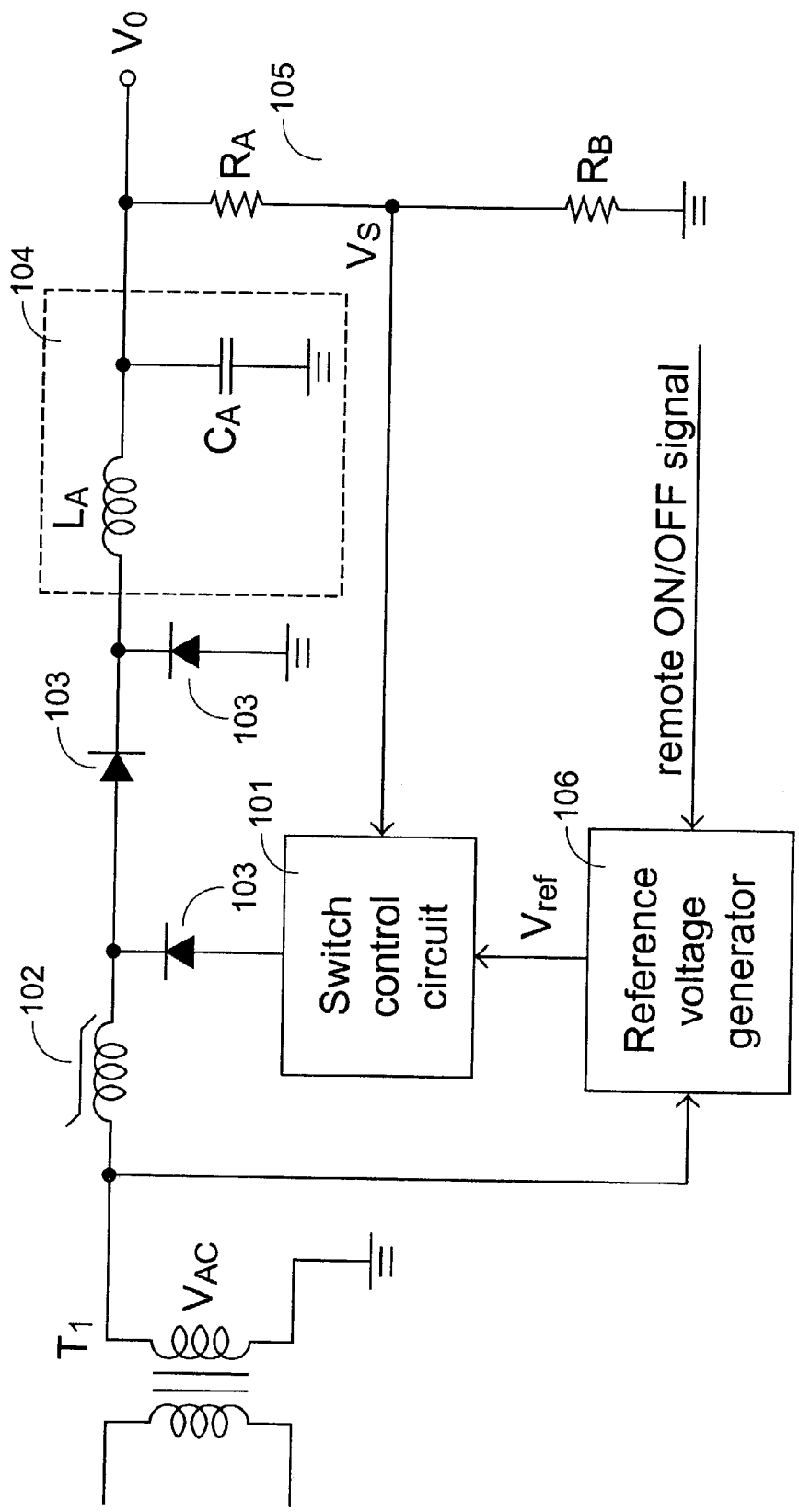
FIG. 1 is a circuit diagram showing a power converter according to the prior art.
Figure 2A:
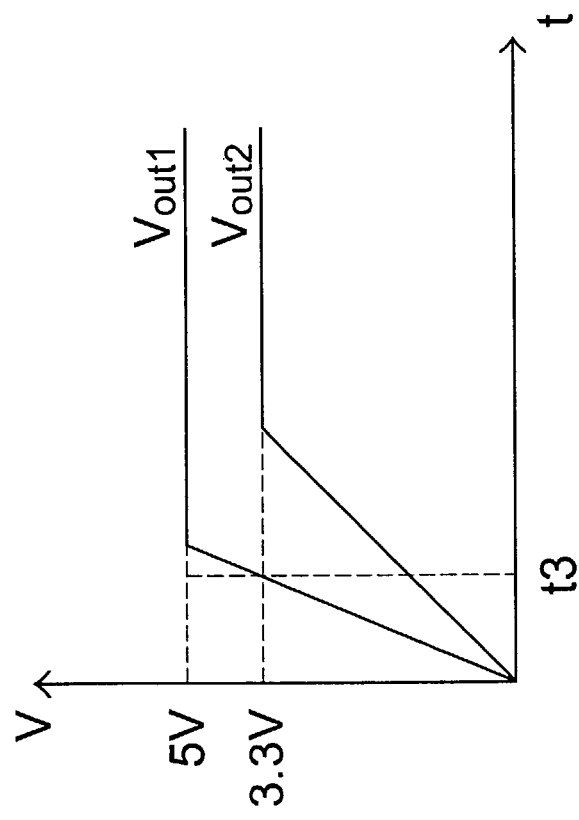
FIG. 2a is a timing diagram showing the output voltage waveforms of a power converter according to the prior art, in which an output voltage with an out-of-control rising slope has not occurred.
Figure 2B:
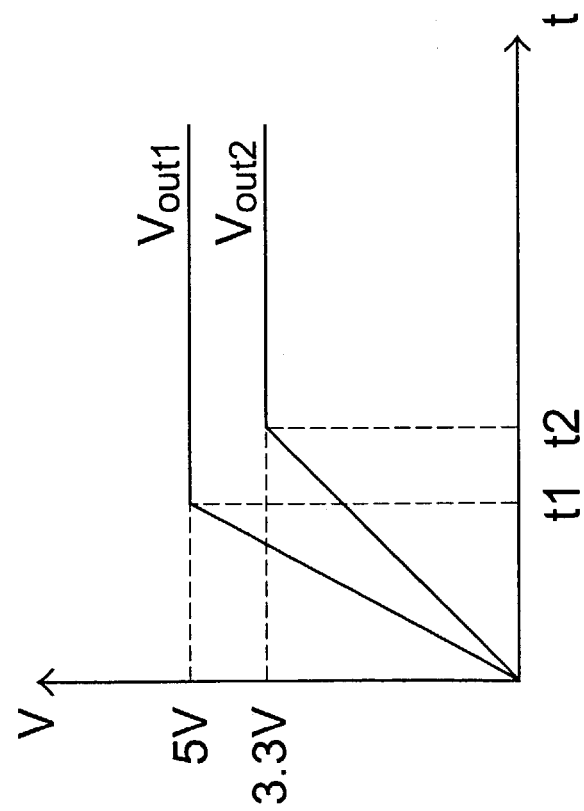
FIG. 2b is a timing diagram showing the output voltage waveforms of a power converter according to the prior art, in which an "rising slope out of control" problem has occurred.
Figure 3:
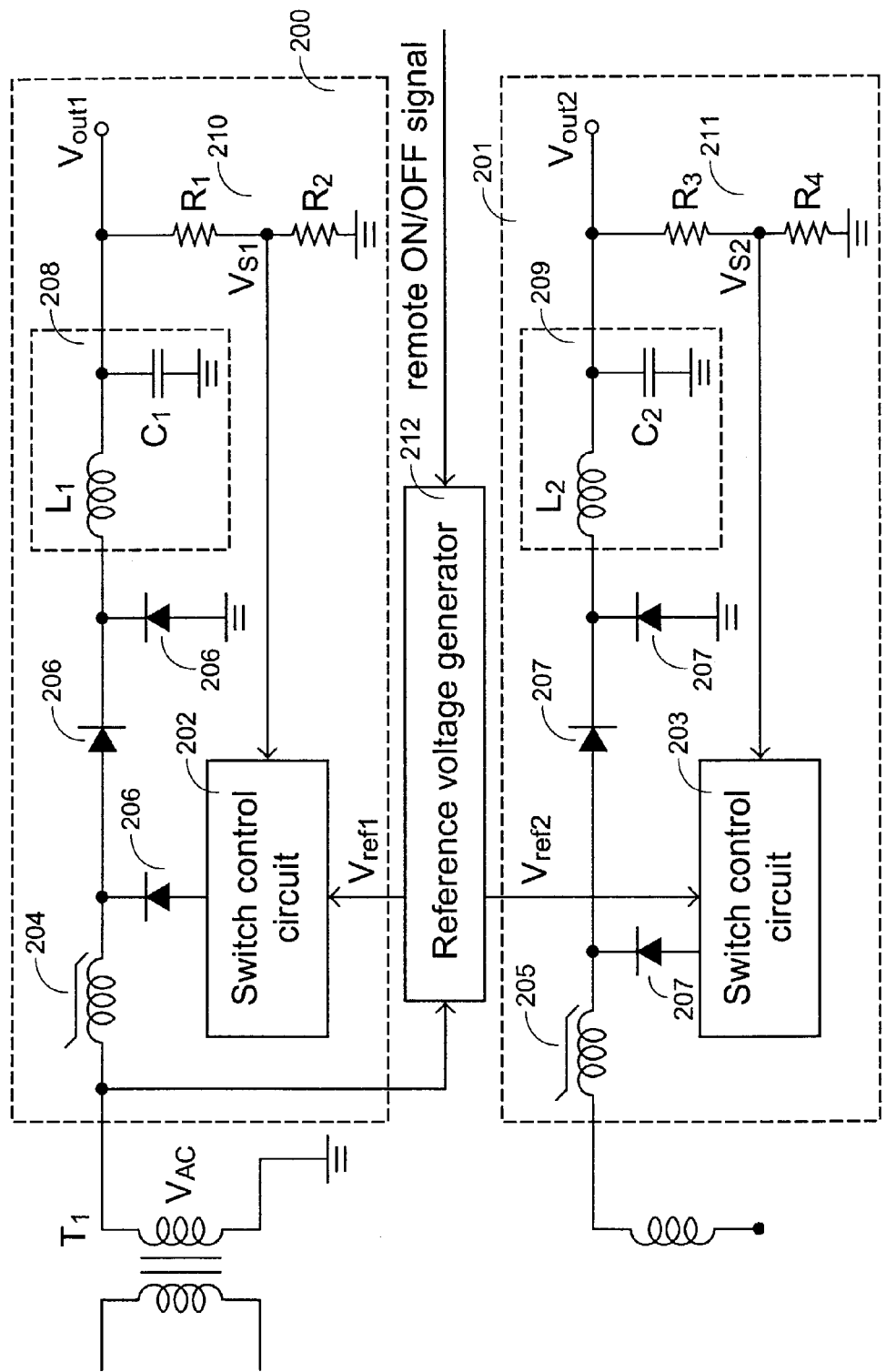
FIG. 3 is a circuit diagram showing a power converter according to a preferred embodiment of the present invention.

A schematic representation illustrating the constitution of a power converter according to a preferred embodiment of the present invention is given in FIG. 3. The power converter according to a preferred embodiment of the present invention is configured to provide multiple output voltages, each of which occupies a predetermined voltage level. In this preferred embodiment, a power converter configured to provide two output voltages both occupying a different predetermined level is taken as an example to explicate the present invention. However, it can be readily understood that the principle of the present invention can be further extends to build a power converter having more than two output voltages, each of which occupies a predetermined voltage level. In this embodiment, the power converter of FIG. 3 includes two circuit sections 200 and 201, each of which is configured to output a predetermined output voltage. The circuit section 200 includes a magnetic amplifier 204 which amplifies an AC voltage induced at a secondary winding of a transformer T1 by way of magnetic coupling, and then the amplified AC voltage is converted into a DC voltage by the on/off operation of the diodes 206. The resulting DC voltage is filtered and smoothed by an output filter 208 comprised of an inductor L1 and a capacitor C1, and thereby provide a first output voltage Vout1 for a load (not shown). Similarly, the circuit section 201 also includes a magnetic amplifier 205 which amplifies an AC voltage induced at an auxiliary winding of a transformer T1 by way of magnetic coupling, and then the amplified AC voltage is converted into a DC voltage by the on/off operation of the diodes 207. The resulting DC voltage is filtered and smoothed by an output filter 209 comprised of an inductor L2 and a capacitor C2, and thereby provided as a second output voltage Vout2 for a load (not shown). In addition, a sensing voltage of the first output voltage Vout1 which is designated with reference numeral $V_{S1}$ is returned back to a switch control circuit 202 through a resistive-type voltage divider 210 comprised of resistors R1 and R2. The switch control circuit 202 uses an internal comparator (for the purpose of simplification of description, it is not shown in the FIG. 3) to compare the sensing voltage $V_{S1}$ with a first reference voltage Vref1 provided by a reference voltage generator 212 and in response thereto generate a Control signal. An internal driving circuit of the switch control circuit 202 which is normally accomplished with a transistor is biased in response to the Control signal so as to drive the diodes 206 to turn on or off, and thus a switching duty cycle of the switch circuits 206 can be regulated and the value of the first output voltage Vout1 can be stabilized.

In a similar manner, the sensing voltage of the second output voltage Vout2 which is designated with reference numeral $V_{S2}$ is returned back to a switch control circuit 203 through a resistive-type voltage divider 211 comprised of resistors R3 and R4. The switch control circuit 203 uses an internal comparator (for the purpose of simplification of description, it is not shown in FIG. 3) to compare the fractional output voltage $V_{S2}$ with a second reference voltage Vref2 provided by a reference voltage generator 212, and in response thereto generate a Control signal. An internal driving circuit of the switch control circuit 203 which is normally accomplished with a transistor is biased in response to a Control signal so as to drive the diodes 207 to turn on or off, and thus a switching duty cycle of the diodes 207 can be regulated and the value of the second output voltage Vout2 can be stabilized. On the other hand, a housekeeping circuit (not shown) transmits a remote ON/OFF signal to the power converter to make Vout1 and Vout2 available.

Figure 4:
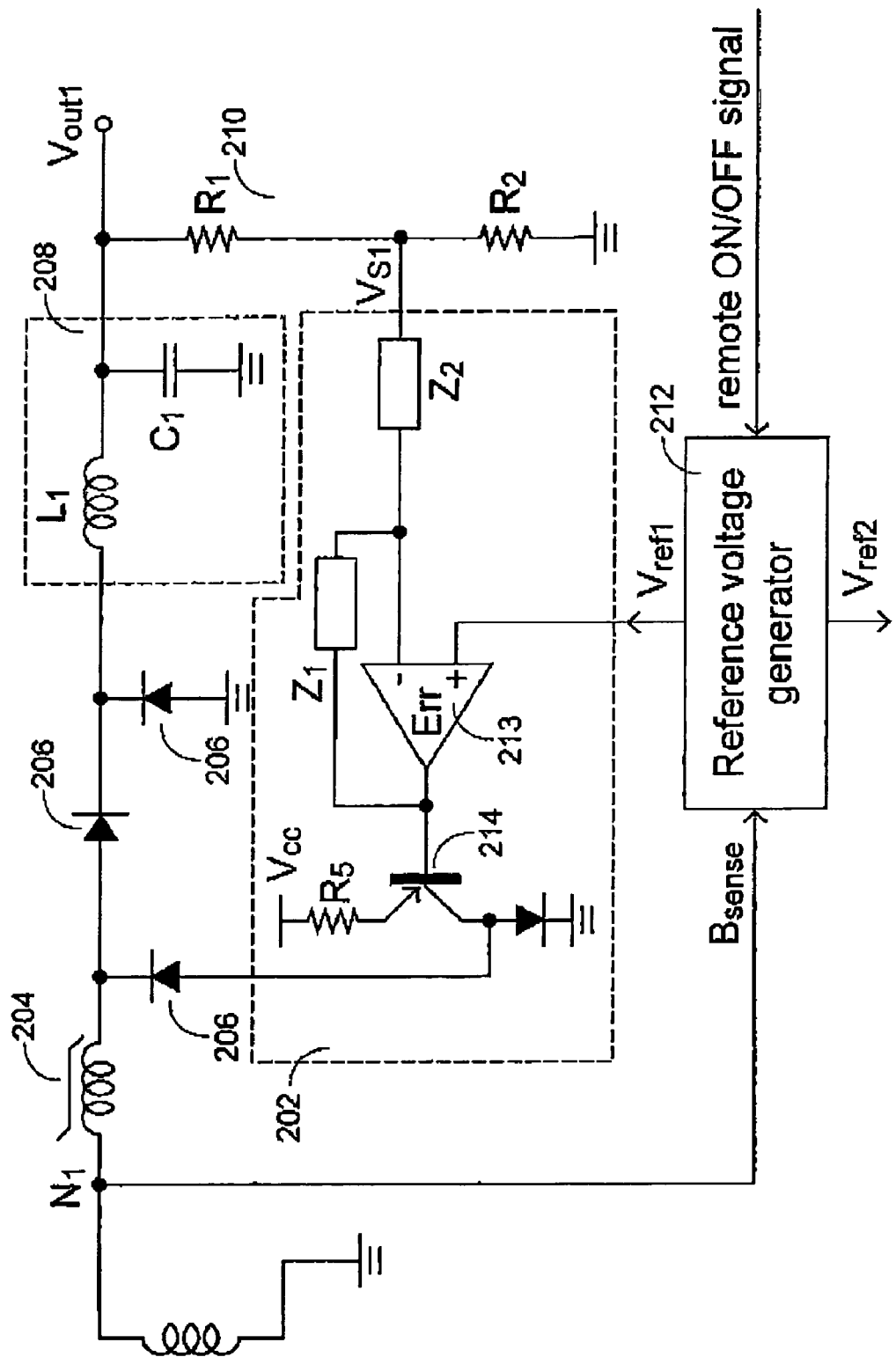
FIG. 4 is a circuit diagram showing a switch control circuit of a power converter according to a preferred embodiment of the present invention.

FIG. 4 shows a circuit configuration of a switch control circuit 202 of FIG. 3. The circuit operation of the switch control circuit 202 will be described as follows. It is to be noted that the switch control circuit 202 and the switch control circuit 203 both have a similar configuration, and their circuit operations are alike. The switch control circuit 202 includes an error amplifier 213 which has an inverting input terminal connected with sensing voltage $V_{S1}$ through an impedance Z2 from the voltage divider 210 and a non-inverting input terminal for receiving a first reference voltage Vref1 from the reference voltage generator 212. Another impedance Z1 is connected across the input end and the output end of the error amplifier 213. The sensing voltage $V_{S1}$ provided by the voltage divider 210 is compared with the first reference voltage Vref1 provided by the reference voltage generator 212 by the error amplifier 213, and the Control signal is thereby generated in response to the comparison result. The Control signal is outputted to a driving circuit 214 which is preferably a bipolar junction transistor (BJT). The emitter voltage of the BJT 214 is derived by applying an external voltage Vcc to the emitter terminal of the BJT 214 through a resistor R5. The driving circuit 214 is used to control Mag-Amp 204 and/or the diodes 206 to turn on or off based on the control signal, so as to regulate the output voltage value of the power converter.

The fundamental theorem for achieving rising slope control according to the present invention is made on the basis of imposing a time delay on a reference voltage that is designated to regulate the value of an output voltage of the power converter during a start-up period of the power converter and tuning a rising slope of the reference voltage, and thereby forcing the rising slope of an output voltage during a start-up period of the power converter to change accordingly, that is, to precipitate the rising slopes of each of the output voltages of a power converter to approach a unanimity during the start-up period. In this manner, the "rising slope out of control" problem can be settled efficiently.

Figure 5:
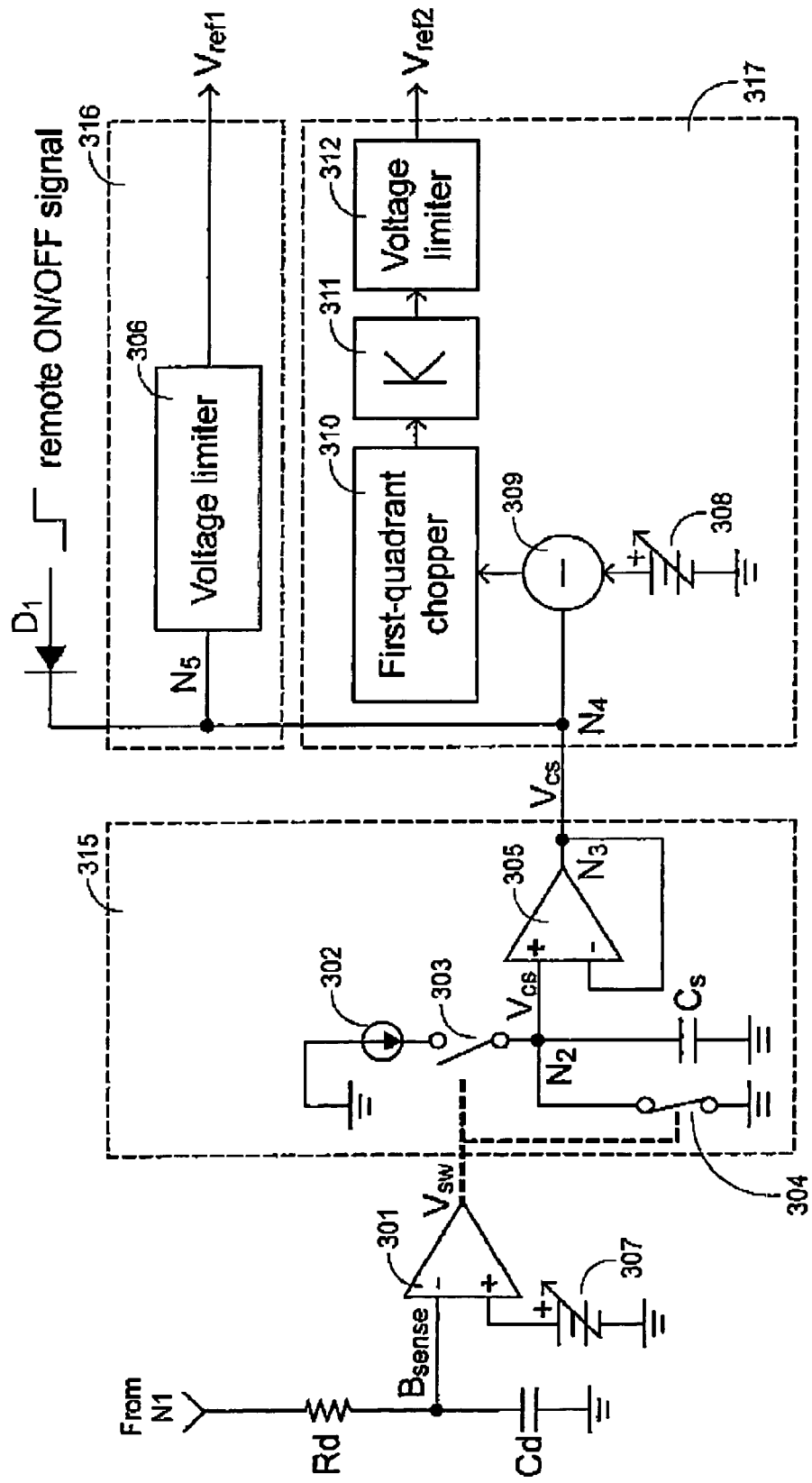
FIG. 5 is a circuit diagram showing a reference voltage generator of a power converter according to a preferred embodiment of the present invention.
Figure 6:
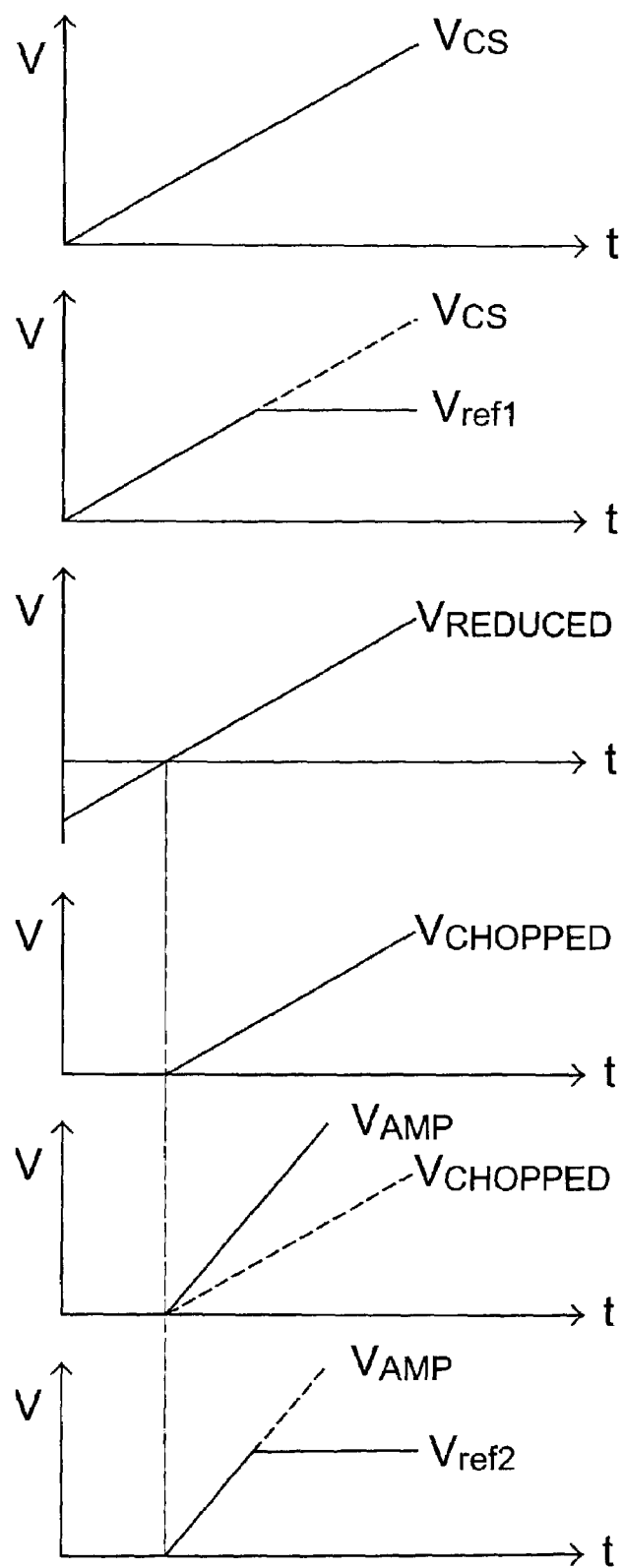
FIG. 6 is a timing diagram showing respective voltage waveforms at each circuit node in a reference voltage generator of a power converter according to a preferred embodiment of the present invention.
Figure 7:
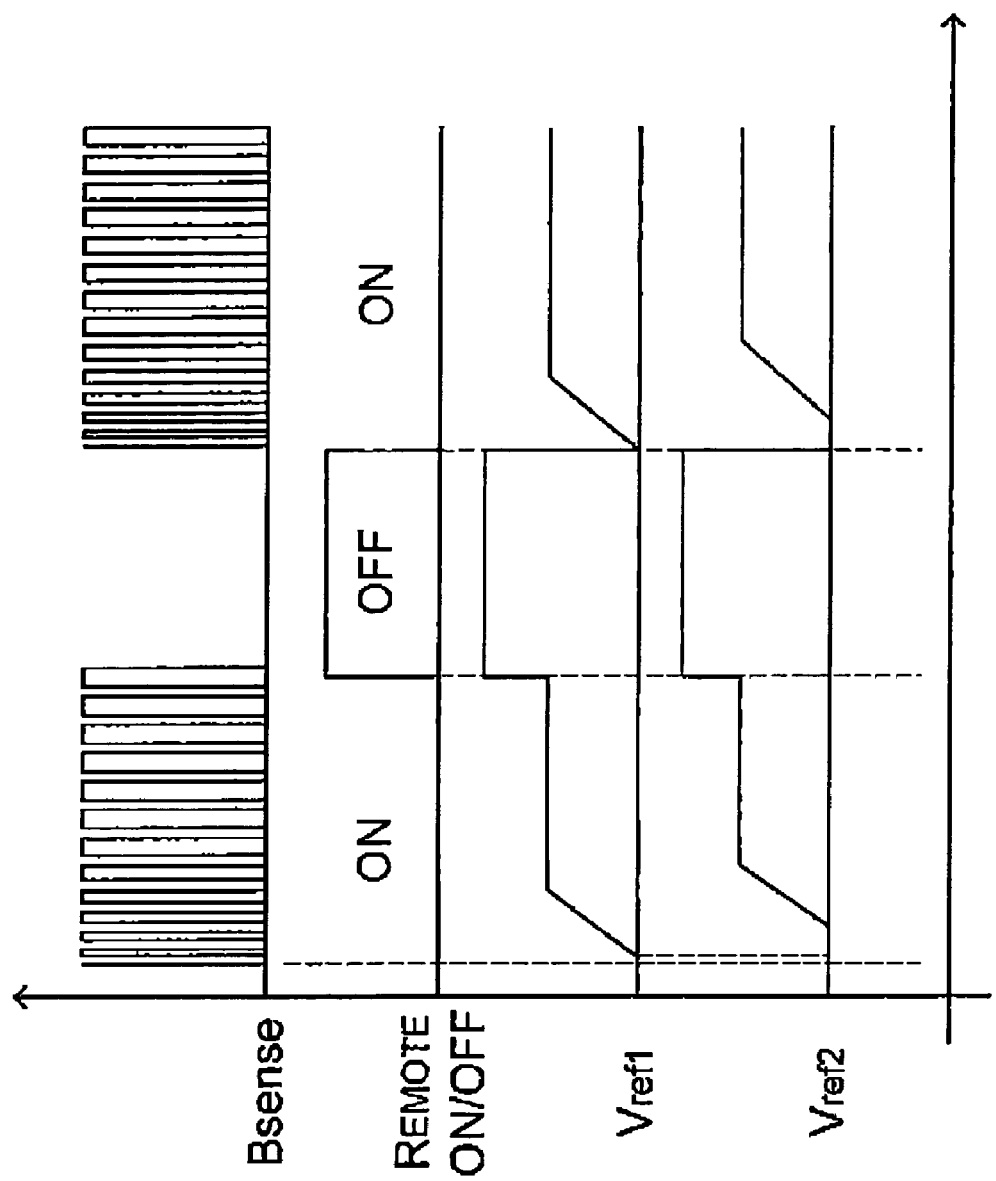
FIG. 7 represents the voltage waveforms of Bsense signal, remote ON/OFF signal, the first reference voltage, and the second reference voltage.

Referring to FIG. 5, the circuit configuration of a reference voltage generator 212 according to a preferred embodiment of the present invention is comprised of a comparator 301 having an inverting input terminal connected to the node N1 shown in FIG. 4 for receiving a sensed bulk voltage Bsense from a secondary winding of a transformer, in which a voltage waveform of the Bsense signal is demonstrated in FIG. 7, and a non-inverting input terminal for receiving a fixed voltage 307. The comparator 301 compares the sensed Bulk voltage Bsense with the fixed voltage 307 and in response thereto provides a switch control signal Vsw for a switch 303 in a circuit for generating linear voltage within a rising slope generating circuit 315. A resister Rd and a capacitor Cd are connecter to the inverting input terminal of the comparator 301. The circuit 315 for generating linear voltage with a rising slope includes switches 303, 304, a current source 302, a capacitor Cs and a voltage follower 305. The switch 303 switches its on/off state in response to a state of the switch signal Vsw. When the switch 303 is ON, the current source 302 charges the capacitor Cs and stores energy in the capacitor Cs. When the switch 303 is OFF, the capacitor Cs starts to discharge the stored energy to a non-inverting input terminal of the voltage follower 305 through a circuit node N2. Under this condition, the voltage appearing at a non-inverting input terminal of the voltage follower 305 is a linear voltage Vcs with a rising slope, wherein its voltage waveform shown in FIG. 6.

The linear voltage Vcs with a rising slope at the circuit node N2 is then coupled to a circuit node N3. The linear voltage Vcs with a rising slope at the circuit node N3 is subsequently transmitted into a first reference voltage generating block 316 and a second reference voltage generating block 317, respectively, and is applied to a circuit node N5 located in the first reference voltage generating block 316 and a circuit node N4 located in the second reference voltage generating block 317.

As shown in FIG. 5, the reference voltage generator 212 according to a preferred embodiment of the present invention further includes a diode D1 having an anode to receive a remote ON/OFF signal and a cathode connecting to a circuit node N5 located in the first reference voltage generating block 316. A representative voltage waveform of the remote ON/OFF signal is shown in FIG. 7. As indicated in FIG. 7, it can be seen that the actual voltage level of the remote ON/OFF signal is positioned at a low level when the remote ON/OFF signal is ON, so that the diode D1 is biased to turn off and both the first reference voltage Vref1 and the second reference voltage Vref2 are determined by the linear voltage Vcs with a rising slope. When the remote ON/OFF signal is OFF, the actual voltage level of the remote ON/OFF signal is positioned at a high level. If a difference between the voltage level of the remote ON/OFF signal and an instantaneous voltage value of the linear voltage Vcs with a rising slope at an instant within this OFF period of the remote ON/OFF signal is less than a threshold voltage value of the diode D1, the diode D1 will remain in OFF state, and the first reference voltage Vref1 and second reference voltage Vref2 are also determined by the linear voltage Vcs with a rising slope. However, if a difference between the voltage level of the remote ON/OFF signal and an instantaneous voltage value of the linear voltage Vcs with a rising slope is larger than a threshold voltage value of the diode D1 within this period, the diode D1 will turn on. If the diode D1 is assumed to be ideal, that is, no voltage drop will be created across the diode when the diode is ON, both the circuit node N5 located in the first reference voltage generating block 316 and the circuit node N4 located in the second reference voltage generating block 317 will receive a high voltage value representing the voltage value of the remote ON/OFF signal during its OFF period, and the first reference voltage Vref1 and the second reference voltage Vref2 are both determined by such a high voltage value.

Thus, in the first reference voltage generating block 316, the signal received at the circuit node N5 is a linear voltage Vcs with a rising slope when the remote ON/OFF signal is ON, and then the linear voltage Vcs will be trimmed by the voltage limiter 306 so that a peak voltage thereof will be limited at a constant voltage level. Also, a resulting voltage made by the voltage limiter 306 serves as a first reference voltage Vref1, wherein its voltage waveform is shown in FIG. 6 and a part of FIG. 7. When the remote ON/OFF signal is OFF and a difference between the voltage level of the remote ON/OFF signal and an instantaneous voltage value of the linear voltage Vcs with a rising slope is larger than a threshold voltage value of the diode D1 within this OFF period, the signal received at the circuit node N5 is a high voltage representing a high voltage value of the remote ON/OFF signal, and the resulting first reference voltage Vref1 will be a high DC voltage having a fixed voltage constant, wherein its voltage waveform is shown as the voltage waveform during the OFF period of the remote ON/OFF signal in FIG. 7.

Similarly, in the second reference voltage generating block 317, the linear voltage with rising slope Vcs is coupled to the circuit node N4 and subtracted from a fixed voltage 308 by a voltage subtractor 309 to obtain a reduced voltage Vreduced. A representative voltage waveform of the reduced voltage Vreduced is shown in FIG. 6. The reduced voltage Vreduced is further processed by a first-quadrant chopper 310 to filter out its components lying within a first quadrant, and a chopped voltage with a time delay imposed Vchopped thereon is obtained, wherein its voltage is shown in FIG. 6. The chopped voltage Vchopped is amplified by an amplifier 311 to increase its rising slope, and thus an amplified voltage $V_{AMP}$ is obtained. The amplified voltage $V_{AMP}$ is then processed by the voltage limiter 312 to limit its peak voltage to a fixed voltage level, and the resulting voltage serves as a second reference voltage Vref2 for the power converter, wherein a representative voltage waveform of the second reference voltage Vref2 is shown in FIG. 6. On the other hand, when the remote ON/OFF signal is OFF, a DC high voltage representing a high voltage of the remote ON/OFF signal is coupled to the circuit node N4. This high DC voltage is then subtracted from the fixed voltage 308 by the voltage subtractor 309 and amplified by the amplifier 311 to generate a second reference voltage Vref2. The resulting voltage waveform of the second reference voltage Vref2 during the OFF period of the remote ON/OFF signal is shown in a part of FIG. 7.

It goes without saying that the output voltage rising slope control technique according to the present invention can impose the time delay on the reference voltage and tune the rising slope of the reference voltage, which is made clear for those skilled in the art from the observation of the voltage waveforms at each node in the circuit configuration of the power converter. The present invention is advantageous in that the output voltages of a power converter can be made to have their rising slopes approach a unanimity with each other during the start-up period, while the "rising slope out of control" problem that may occur in the situation of multiple output voltages can be suppressed.

Although the present invention has been described and illustrated in detail, it is to be clearly understood that the same is by the way of illustration and example only and is not to be taken by way of limitation, the spirit and scope of the present invention being limited only by the terms of the appended claims.

What is claimed is:

1. A power converter for providing multiple output voltages of predetermined levels, comprising:
   at least two magnetic amplifiers, each of which is magnetically coupled with an AC voltage induced at a winding of a transformer for amplifying the AC voltage;
   at least two switch circuits, each of which is coupled to a corresponding one of the magnetic amplifiers for converting an amplified AC voltage from a corresponding one of the magnetic amplifiers into a DC voltage in response to an on/off operation thereof;
   at least two output filters, each of which is coupled to a corresponding one of the switch circuits for providing a predetermined level of output voltage for a load;
   at least two switch control circuits, each of which compares an output voltage with a reference voltage and in response thereto generate a control signal to control an on/off operation of a corresponding one of the switch circuits; and
   a reference voltage generator coupled to each of the switch control circuit for providing each of the switch control circuit with a reference voltage, wherein the reference voltages provided by the reference voltage generator are sufficient to have the rising slopes of each output voltage of the power converter approach a unanimity with each other during a start-up period of the power converter;
   wherein the reference voltage generator includes a linear voltage generating circuit for generating a linear voltage with a rising slope, a diode having an anode for receiving a remote ON/OFF signal and a cathode for receiving the linear voltage with a resing slope, a first reference voltage generating block for limiting the linear voltage with a rising slope based on a predetermined voltage level and thereby generating a first reference voltage, and a second reference voltage generating block for imposing a time delay on the linear voltage with a rising slope and tuning a rising slope of the linear voltage with a rising slope, and thereby generating a second reference voltage.

2. The power converter of claim 1 wherein the reference voltage generator further includes a comparator which compares a sensed bulk voltage with a fixed voltage and in response thereto generates a switch signal.

3. The power converter of claim 2 wherein the linear voltage generating circuit further comprises:
   a current source;
   a capacitor having one end connected to a ground terminal;
   a switch coupled between the current source and the capacitor which is biased to turn on and off in response to the switch signal, wherein the switch allows the current source to charge the capacitor under an OFF state and allows the capacitor to discharge energy stored therein under an ON state so as to establish a linear voltage with a rising slope; and
   a voltage follower for coupling the liner voltage with a rising slope to an output circuit node.

4. The power converter of claim 3 wherein the first reference voltage generating block comprises a voltage limiter for limiting a peak voltage value of the linear voltage with a rising slope at a predetermined voltage level to generate a first reference voltage.

5. The power converter of claim 3 wherein the second reference voltage generating block comprises:
   a voltage subtractor for subtracting a fixed voltage from either the linear voltage with a rising slope or a high DC voltage to generate a reduced linear voltage or a DC voltage;
   a first-quadrant chopper for removing components lying in a first quadrant of the reduced linear voltage with a rising slope so as to impose a time delay on the reduced linear voltage with a rising slope;
   an amplifier for amplifying the linear voltage generated by the first-quadrant chopper to tune a rising slope of the linear voltage; and
   a voltage limiter for limiting a peak voltage value of the linear voltage generated by the amplifier at a predetermined voltage level so as to generate the second reference voltage.

6. The power converter of claim 1 wherein the switch control circuit further comprises:
   an error amplifier which compares a fraction of one of the output voltages of the power converter with a reference voltage and in response thereto outputs a control signal; and
   a driving circuit for driving one of the switch circuits to turn on and off based on the control signal.

7. The power convener of claim 6 wherein the driving circuit is a bipolar junction transistor.

8. A reference voltage generator for a power converter, comprising:
   a linear voltage generating circuit for generating a linear voltage with a rising slope;
   a first reference voltage generating block for limiting the linear voltage with a rising slope based on a predetermined voltage level and thereby generating a first reference voltage; and
   a second reference voltage generating block for imposing a time delay on the linear voltage with a rising slope and tuning a rising slope of the linear voltage with a rising slop; and thereby generating a second reference voltage.

9. The reference voltage generator of claim 8 further comprising a comparator which compares a sensed Bulk voltage with a fixed voltage and in response thereto generate a switch signal.

10. The reference voltage generator of claim 9 wherein the linear voltage generating circuit further comprises:
    a current source;
    a capacitor having one end connected to a ground terminal;
    a switch coupled between the current source and the capacitor which is biased to turn on and off in response to the switch signal, wherein the switch allows the current source to charge the capacitor under an OFF state and allows the capacitor to discharge energy stored therein under an ON state so as to establish a linear voltage with a rising slope; and
    a voltage follower for coupling a linear voltage with a rising slope to an output circuit node.

11. The reference voltage generator of claim 10 wherein the first reference voltage generating block comprises a voltage limiter for limiting a peak voltage value of the linear voltage with a rising slope at a predetermined voltage level to generate a first reference voltage.

12. The reference voltage generator of claim 11 wherein the second reference voltage generating block comprises:
- a voltage subtractor for subtracting a fixed voltage from either the linear voltage with a rising slope or a high DC voltage to generate a reduced linear voltage or a DC voltage;
- a first-quadrant chopper for removing components lying in a first quadrant of the reduced linear voltage with a rising slope so as to impose a time delay on the reduced linear voltage with a rising slope;
- an amplifier for amplifying the linear voltage generated by the first-quadrant chopper to tune a rising slope of the linear voltage; and
- a voltage limiter for limiting a peak voltage value of the linear voltage generated by the amplifier at a predetermined voltage level so as to generate the second reference voltage.

* * * * *